United States Patent
Pallapolu et al.

(10) Patent No.: US 12,236,214 B2
(45) Date of Patent: *Feb. 25, 2025

(54) THREE-DIMENSIONAL SOFTWARE CODE REVIEW ENGINE

(71) Applicant: BANK OF AMERICA CORPORATION, Charlotte, NC (US)

(72) Inventors: Kalyan Pallapolu, Telangana (IN); Suneetha Padala, Porter Ranch, CA (US); R. K. Kiran Kumar, Chennai (IN); Gali Mohan Sreenivas, Andhra Pradesh (IN); Srinath Nelakuditi, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,002

(22) Filed: Jan. 10, 2024

(65) Prior Publication Data

US 2024/0143291 A1 May 2, 2024

Related U.S. Application Data

(63) Continuation of application No. 17/733,362, filed on Apr. 29, 2022, now Pat. No. 11,914,976.

(51) Int. Cl.
*G06F 8/34* (2018.01)
*G06F 8/36* (2018.01)
(Continued)

(52) U.S. Cl.
CPC .................. *G06F 8/34* (2013.01); *G06F 8/36* (2013.01); *G06F 8/41* (2013.01); *G06T 19/006* (2013.01); *G06N 20/00* (2019.01)

(58) Field of Classification Search
None
See application file for complete search history.

(56) References Cited

U.S. PATENT DOCUMENTS 9,160,762 B2   10/2015   Brake et al.
9,916,224 B2   3/2018    Macleod et al.
(Continued)

OTHER PUBLICATIONS

L. Merino, M. Lungu and C. Seidl, "Unleashing the Potentials of Immersive Augmented Reality for Software Engineering," 2020 IEEE 27th International Conference on Software Analysis, Evolution and Reengineering (SANER), London, ON, Canada, 2020, pp. 517-521, doi: 10.1109/SANER48275.2020.9054812. (Year: 2020).

*Primary Examiner* — Andrew M. Lyons
(74) *Attorney, Agent, or Firm* — Moore & Van Allen PLLC; Anup Iyer

(57) ABSTRACT

Systems, computer program products, and methods are described herein for reviewing software code changes in an augmented reality platform. The present invention is configured to receive a request to merge a code change with a main project repository; in response, retrieve metadata associated with the code change; generate a standard compiler output by compiling the metadata associated with the code change; identify one or more objects and one or more layouts from the standard compiler output; retrieve one or more 3D models for the one or more objects; generate an augmented modeling session for display on a first user input device; receive, from the first user input device, a user acknowledgement of the code change; and merge the code change with the project repository.

20 Claims, 6 Drawing Sheets

(51) Int. Cl.
　　*G06F 8/41*　　　(2018.01)
　　*G06N 20/00*　　(2019.01)
　　*G06T 19/00*　　(2011.01)

(56) References Cited

U.S. PATENT DOCUMENTS

| | | | |
|---|---|---|---|
| 10,241,808 B2 | 3/2019 | Kolagatla et al. | |
| 10,289,409 B2 | 5/2019 | Mandava et al. | |
| 10,303,517 B1 | 5/2019 | Sloyan et al. | |
| 10,318,412 B1 | 6/2019 | Mckearney, Jr. et al. | |
| 10,394,689 B1 | 8/2019 | Ledet | |
| 10,585,663 B1 | 3/2020 | Anderson et al. | |
| 10,585,780 B2 | 3/2020 | Woulfe et al. | |
| 10,592,391 B1 | 3/2020 | Anderson et al. | |
| 10,754,640 B2 | 6/2020 | Woulfe et al. | |
| 10,846,082 B2 | 11/2020 | Fan et al. | |
| 11,074,043 B2 | 7/2021 | Bulut et al. | |
| 11,157,844 B2 | 10/2021 | Stevens | |
| 11,163,731 B1 | 11/2021 | Riddell | |
| 11,216,342 B2 | 1/2022 | Scoda | |
| 11,262,983 B2 | 3/2022 | Kuris et al. | |
| 11,288,592 B2 | 3/2022 | Woulfe et al. | |
| 11,508,111 B1 | 11/2022 | Dragoljevic | |
| 11,675,571 B1 | 6/2023 | Makhija et al. | |
| 2017/0109933 A1 | 4/2017 | Voorhees et al. | |
| 2017/0243352 A1 | 8/2017 | Kutliroff et al. | |
| 2018/0005440 A1 | 1/2018 | Mullins | |
| 2018/0082451 A1 | 3/2018 | Dey et al. | |
| 2018/0349108 A1 | 12/2018 | Brebner | |
| 2019/0042900 A1* | 2/2019 | Smith | G06V 10/96 |
| 2019/0228319 A1 | 7/2019 | Gupta et al. | |
| 2019/0346981 A1 | 11/2019 | Pasala et al. | |
| 2020/0060007 A1 | 2/2020 | Harrison et al. | |
| 2020/0104102 A1 | 4/2020 | Brockschmidt et al. | |
| 2020/0356350 A1 | 11/2020 | Penland et al. | |
| 2021/0110557 A1 | 4/2021 | Busey | |
| 2021/0389850 A1 | 12/2021 | Charlton et al. | |
| 2023/0206573 A1 | 6/2023 | Kim et al. | |

* cited by examiner

THREE-DIMENSIONAL SOFTWARE CODE REVIEW ENGINE

CROSS-REFERENCE TO RELATED APPLICATION

This application is a continuation application of and claims priority to U.S. patent application Ser. No. 17/733,362 of the same title and filed Apr. 29, 2022; the contents of which are also incorporated herein by reference.

FIELD OF THE INVENTION

The present invention embraces a system for reviewing software code changes in an augmented reality platform.

BACKGROUND

Code change review is a software quality assurance activity in which one or several people check a program mainly by viewing and reading parts of its source code. When developer submits code for review, the review typically analyzes the code for new functionality being introduced and any potential impact of the code to existing functionality. Current code change review process is a manual, conscious and systematic process which tends to be tedious, with no option for the reviewer to visualize the new functionality introduced by the code change. Furthermore, the manual nature of the review process often leads to detrimental effects to existing functionality once the code is deployed to a production environment.

There is a need for a system for reviewing software code changes in an augmented reality platform.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for reviewing software code changes in an augmented reality platform is presented. The system comprising: at least one non-transitory storage device; and at least one processor coupled to the at least one non-transitory storage device, wherein the at least one processor is configured to: receive, from a first user input device, a pull request to merge a code change with a main project repository; in response, retrieve, from a code change repository, metadata associated with the code change; generate a standard compiler output by compiling the metadata associated with the code; identify, using a machine learning (ML) subsystem, one or more objects and one or more layouts associated with the one or more objects from the standard compiler output; retrieve, from a three dimensional (3D) object repository, one or more 3D models for the one or more objects; generate, using a 3D interactive platform, an augmented modeling session for display on the first user input device, wherein the augmented modeling session comprises at least the one or more 3D models for the one or more objects based on the one or more layouts for user review; receive, from the first user input device, a user acknowledgement of the code change based on at least the user review; and merge the code change with the project repository in response to receiving the user acknowledgement.

In some embodiments, identifying the one or more objects and the one or more layouts further comprises: deploying, using the ML subsystem, a trained ML model on the standard compiler output, wherein the standard compiler output is an image; overlaying, using the trained ML model, an S×S matrix on the standard compiler output, thereby creating a grid-based object identification framework; and detecting, using the trained ML model, the one or more objects and the one or more layouts in the grid-based object identification framework, wherein the one or more layouts indicate positional attributes of the one or more objects within the grid-based object identification framework.

In some embodiments, detecting further comprises: generating one or more bounding boxes identifying the one or more objects; and classifying the one or more bounding boxes into one or more class labels, wherein the one or more class labels identify the one or more objects.

In some embodiments, the at least one processor is further configured to: query the 3D object repository using the one or more class labels to identify the one or more 3D models for the one or more objects; and retrieve the one or more 3D models for the one or more objects.

In some embodiments, the at least one processor is further configured to: generate a feature set using one or more predefined objects with one or more known identifiers, wherein the one or more known identifiers are used as the one or more class labels; and train, using the ML subsystem, an ML model using the feature set to generate the trained ML model.

In some embodiments, the at least one processor is further configured to: receive, from a second user input device, the metadata associated with the code change; and store the metadata associated with the code change in the code change repository.

In some embodiments, the at least one processor is further configured to: receive, from the first user input device via the 3D interactive platform, one or more edits for the code change based on at least the user review; generate a revised code change suggestion based on at least receiving the one or more edits for the code change; and transmit control signals configured to cause the second user input device to display the revised code change suggestion.

In another aspect, a computer program product for reviewing software code changes in an augmented reality platform is presented. The computer program product comprising a non-transitory computer-readable medium comprising code causing a first apparatus to: receive, from a first user input device, a pull request to merge a code change with a main project repository; in response, retrieve, from a code change repository, metadata associated with the code change; generate a standard compiler output by compiling the metadata associated with the code; identify, using a machine learning (ML) subsystem, one or more objects and one or more layouts associated with the one or more objects from the standard compiler output; retrieve, from a three dimensional (3D) object repository, one or more 3D models for the one or more objects; generate, using a 3D interactive platform, an augmented modeling session for display on the first user input device, wherein the augmented modeling session comprises at least the one or more 3D models for the one or more objects based on the one or more layouts for user review; receive, from the first user input device, a user acknowledgement of the code change based on at least the user review; and merge the code change with the project repository in response to receiving the user acknowledgement.

In yet another aspect, a method for reviewing software code changes in an augmented reality platform is presented. The method comprising: receiving, from a first user input device, a pull request to merge a code change with a main project repository; in response, retrieving, from a code change repository, metadata associated with the code change; generating a standard compiler output by compiling the metadata associated with the code; identifying, using a machine learning (ML) subsystem, one or more objects and one or more layouts associated with the one or more objects from the standard compiler output; retrieving, from a three dimensional (3D) object repository, one or more 3D models for the one or more objects; generating, using a 3D interactive platform, an augmented modeling session for display on the first user input device, wherein the augmented modeling session comprises at least the one or more 3D models for the one or more objects based on the one or more layouts for user review; receiving, from the first user input device, a user acknowledgement of the code change based on at least the user review; and merging the code change with the project repository in response to receiving the user acknowledgement.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
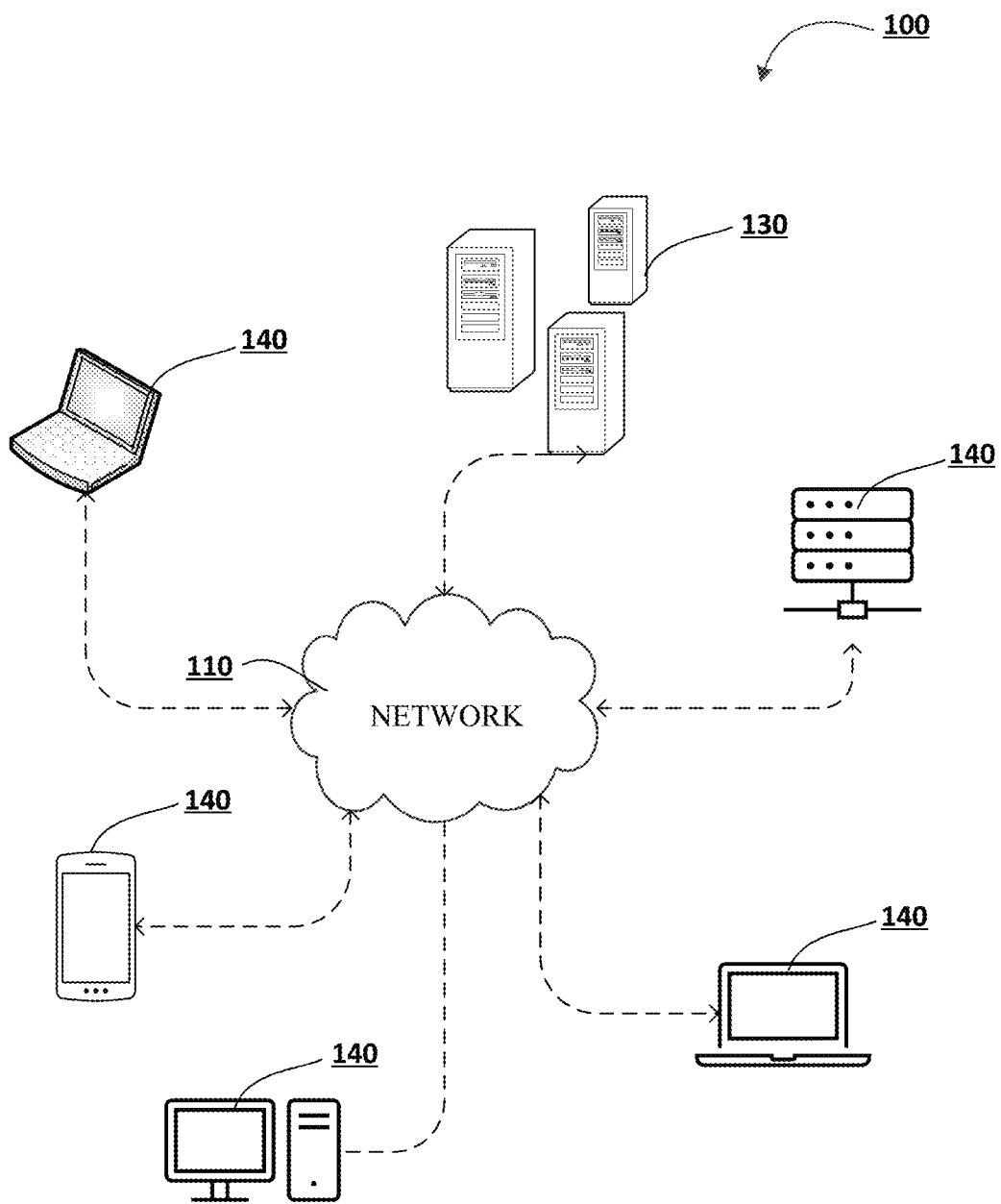
Figure 1B:
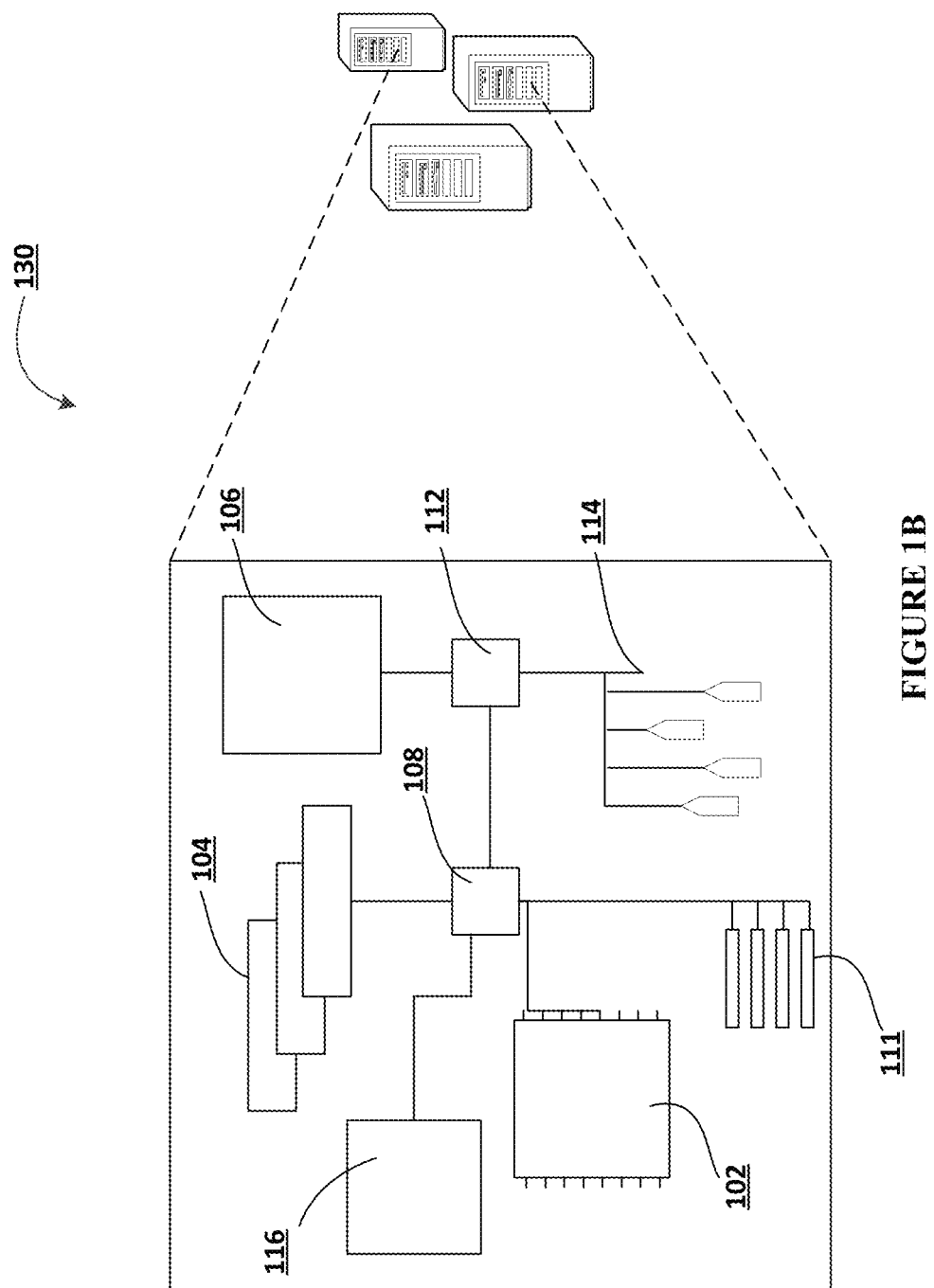
Figure 1C:
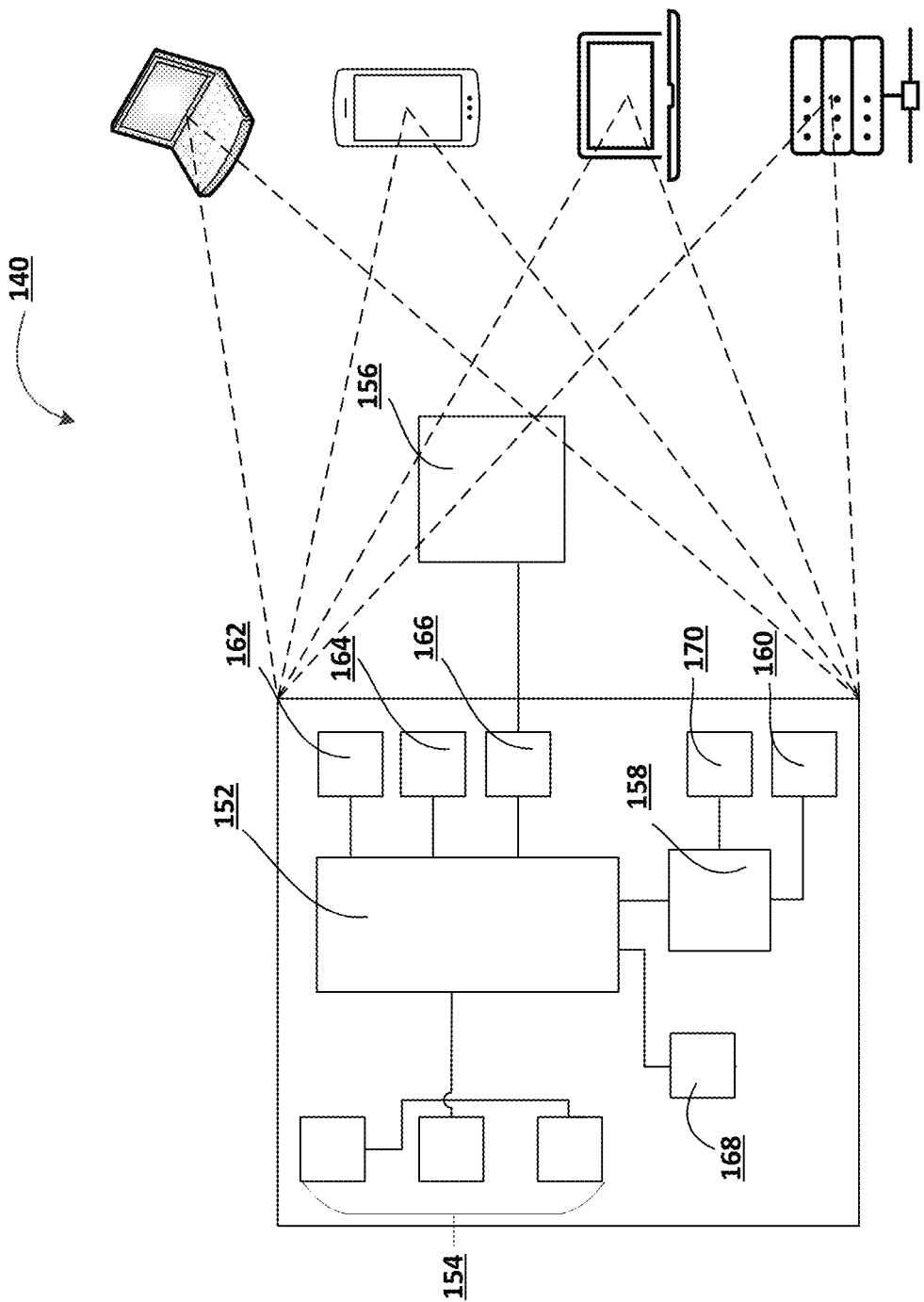
Figure 2:
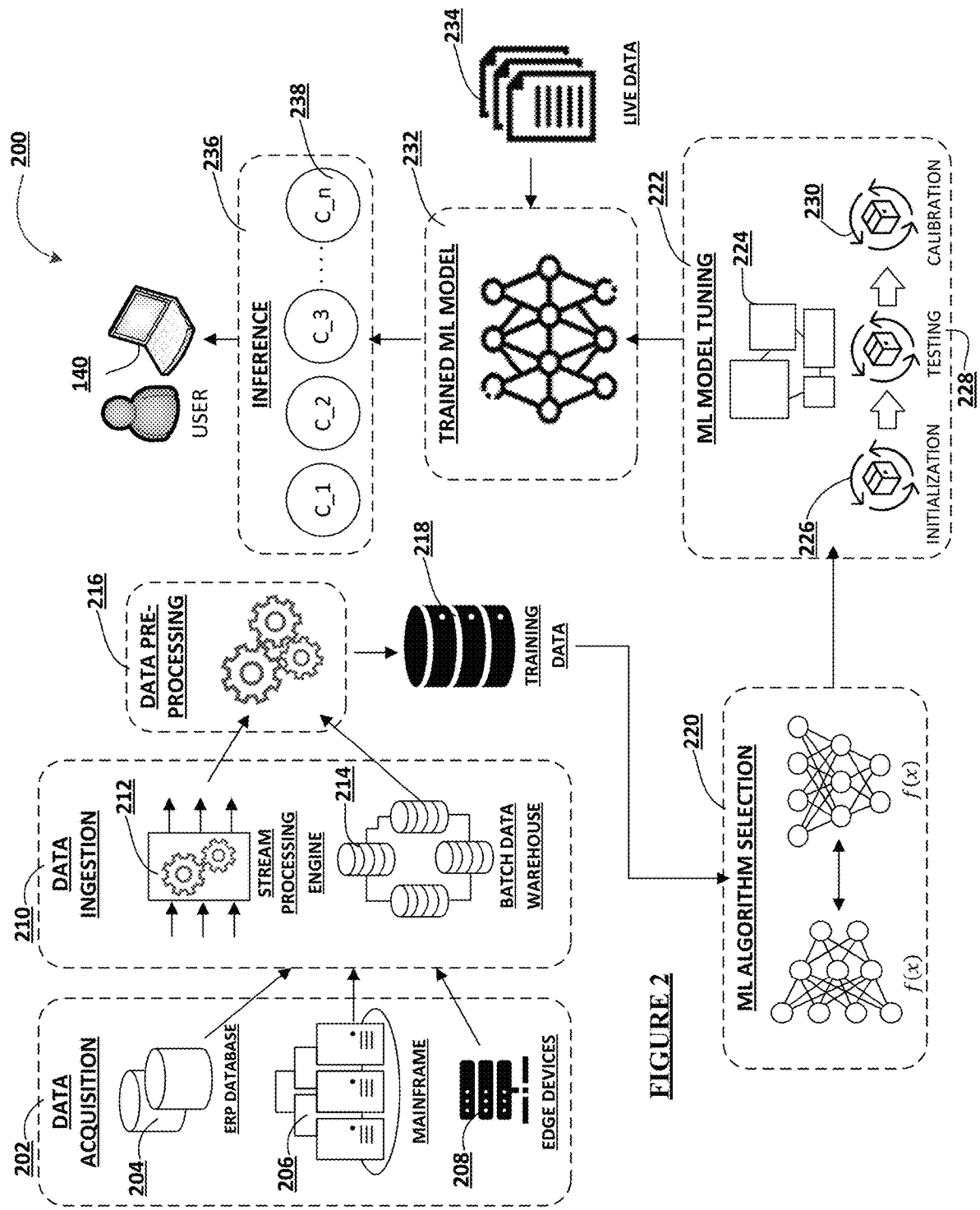
Figure 3:
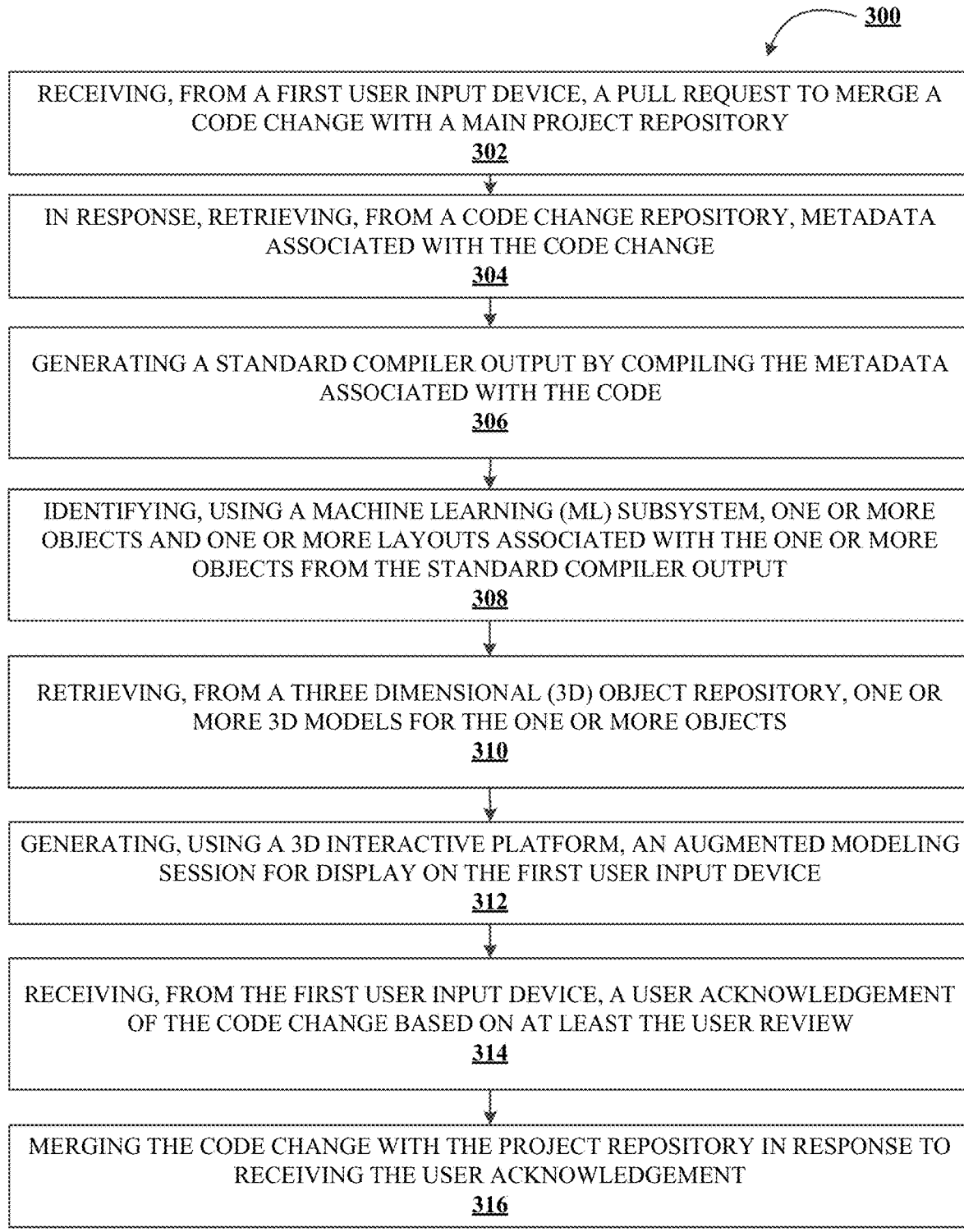
Figure 4:
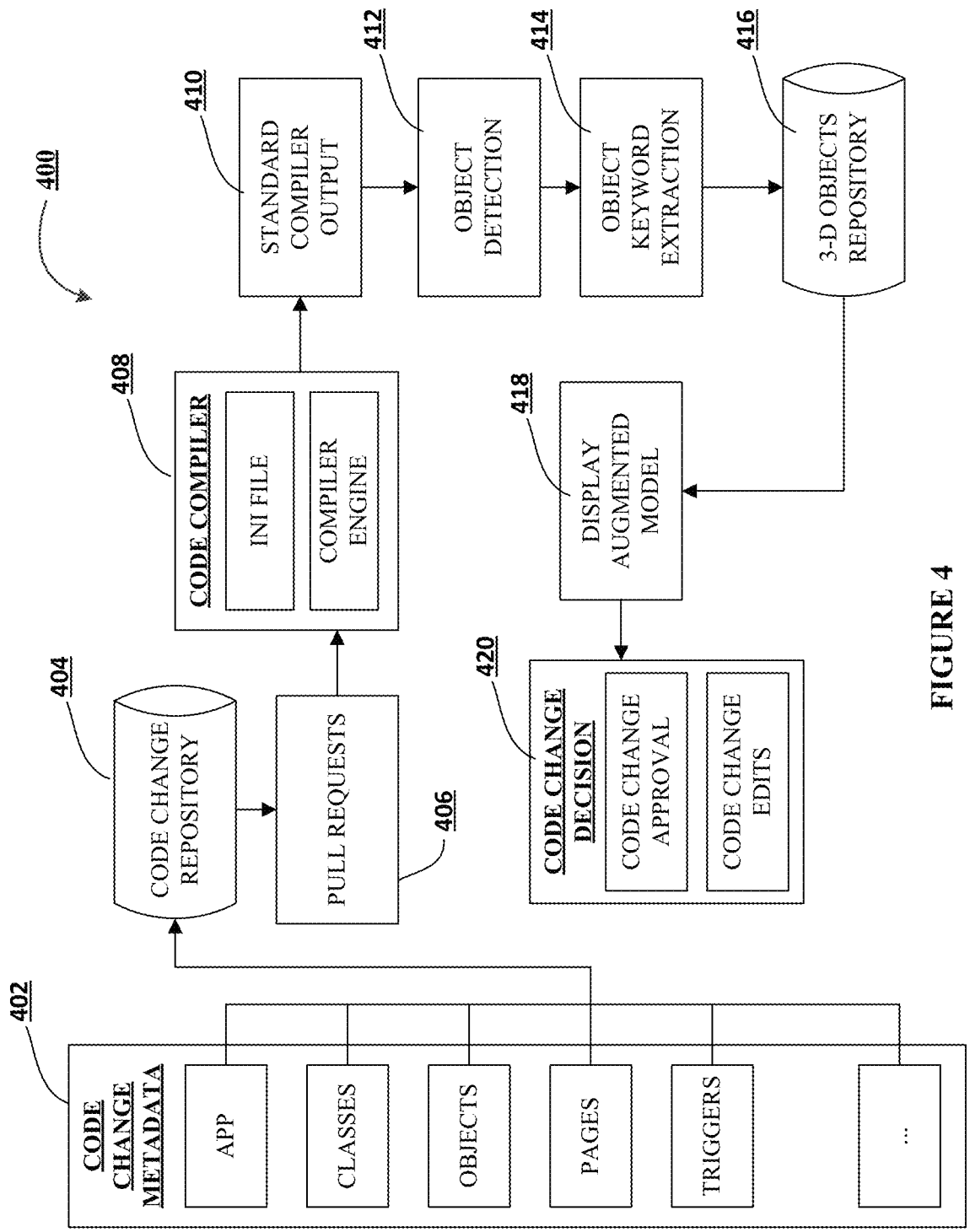

Having thus described embodiments of the invention in general terms, reference will now be made the accompanying drawings, wherein:

FIGS. 1A-1C illustrates technical components of an exemplary distributed computing environment for reviewing software code changes in an augmented reality platform, in accordance with an embodiment of the invention;

FIG. 2 illustrates an exemplary machine learning (ML) subsystem architecture, in accordance with an embodiment of the invention;

FIG. 3 illustrates a process flow for reviewing software code changes in an augmented reality platform, in accordance with an embodiment of the invention; and FIG. 4 illustrates a data flow diagram for reviewing software code changes in an augmented reality platform, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Code change review is a software quality assurance activity in which one or several people check a program mainly by viewing and reading parts of its source code. When developer submits code for review, the review typically analyzes the code for new functionality being introduced and any potential impact of the code to existing functionality. Current code change review process is a manual, conscious and systematic process, which tends to be tedious, with very no option for the reviewer to visualize the new functionality introduced by the code change. Furthermore, the manual nature of the review process often leads to detrimental effects to existing functionality once the code is deployed to a production environment. In cases where the code change is a source code portion for an existing application, the current process of reviewing source code often causes breaks in functionalities of the existing application. If this source code being deployed to patch a newly identified security vulnerability in the application, the review process not only needs to be fast, but also as accurate as possible. Any delay or mistake in the review may result in exacerbation of the security vulnerability that may permeate other portions of the computing environment. In cases where the code change is a source code portion for a new application, the current process of reviewing the source code may create delays in the application development cycle.

Accordingly, the present invention provides a technical solution to a technical problem. As described herein, the technical problem includes a need for a more accurate code change review process. The technical solution presented herein allows for visualizing the code change in an augmented 3D modeling session, whereby the user may interact with the code change and review the source code more efficiently. To this end, the present invention, generates a pull request based on any new code changes, i.e., source code, submitted by developers, giving the option for the user, i.e., reviewer, to review the code change in an augmented modeling sessions hosted on a 3D interactive platform. The user can then choose to review the code change (including associated metadata) on such a platform, thus triggering the code compiler. Triggering the code compiler automatically initiates an associated configuration file (INI file) that includes settings and preferences (delimited by a string in square brackets) with each section containing one or more name and value parameters for the compiler engine. The compiler engine then generates a standard compiler output by compiling the code change. In cases where there is an issue with compiling the code change, the present invention automatically rejects the source code and notifies the developer of the issue. If the compilation is successful, then the standard compiler output is fed to the machine learning (ML) subsystem. The ML subsystem may employ object detection algorithms such as convolutional neural networks (R-CNN, Region-Based Convolutional Neural Networks), Fast R-CNN, and YOLO (You Only Look Once), among others, to identify and label various objects and associated layouts in the new functionalities introduced by the code change. These labels are then used to query a 3D object repository to retrieve 3D models for the identified objects. These 3D models are then displayed in an augmented modeling session on a 3D interactive platform where the user can interact with the objects and their corresponding layouts. On this platform, the user may manipulate the objects, change the layouts, test functionalities introduced by the code change, and visualize the review process. The user may then provide their acknowledgement of the code change, suggest edits to the developer, and/or reject the code change altogether. The user may suggest edits to the code change by modifying the 3D display of the code change in the augmented session. In such cases, a revised code change suggestion is generated as an expected view based on the user edits and sent to the developer with any additional comments.

FIGS. 1A-1C illustrate technical components of an exemplary distributed computing environment for reviewing software code changes in an augmented reality platform 100, in accordance with an embodiment of the invention. As shown in FIG. 1A, the distributed computing environment 100 contemplated herein may include a system 130, a client device(s) 140, and a network 110 over which the system 130 and client device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 140 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client device(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the invention. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other client devices) permissioned access to the protected resources of the client device(s) 140, which may include a GPS device, an image capturing component (e.g., camera), a microphone, and/or a speaker.

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert it to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for reviewing software code changes in an augmented reality platform 300, in accordance with an embodiment of the invention. As shown in block 302, the process flow includes receiving, from a first user input device, a pull request to merge a code change with a main project repository. In some embodiments, code change may refer to any source code changes created by a developer for integration into an application. Accordingly, the system may be configured to retrieve, from a developer, metadata associated with the code change. In one aspect, the metadata may include applications, classes, objects, pages, triggers, flows, and/or the like. In response, the system may be configured to store the metadata in a code change repository. In some embodiments, in addition to storing the metadata in the code change repository, the system may be configured to generate a pull request capability that allows a user to retrieve the code change from a code change repository to determine whether or not it is ready to be released.

Next, as shown in block 304, the process flow includes in response, retrieving, from a code change repository, metadata associated with the code change. When the user chooses to review the code, the user may access the pull request, thus triggering the code compiler. In some embodiments, in response, the system may be configured to automatically initiate an associated configuration file (INI file) that includes settings and preferences (delimited by a string in square brackets) with each section containing one or more name and value parameters for the compiler engine.

Next, as shown in block 306, the process flow includes generating a standard compiler output by compiling the metadata associated with the code. In cases where there is an issue with compiling the code change, the present invention automatically rejects the source code and notifies the developer of the issue. If the compilation is successful, then the standard compiler output is fed to the machine learning (ML) subsystem.

Next, as shown in block 308, the process flow includes identifying, using a machine learning (ML) subsystem, one or more objects and one or more layouts associated with the one or more objects from the standard compiler output. In some embodiments, the objects may include specific features which when activated, may perform a specific function. The location of each object on the user interface may be referred to as its layout. Thus, any object introduced by the code change typically is accompanied by an input that indicates its location on the user interface.

In some embodiments, to identify the one or more objects and the one or more layouts, the system may be configured to deploy, using the ML subsystem, a trained ML model on the standard compiler output, wherein the standard compiler output is an image. To this end, the ML subsystem may employ object detection algorithms such as convolutional neural networks (R-CNN, Region-Based Convolutional Neural Networks), Fast R-CNN, and YOLO (You Only Look Once), among others, to identify and label various objects and associated layouts in the new functionalities introduced by the code change. As described herein, the machine learning model may refer to a mathematical model generated by machine learning algorithms based on training data, to make predictions or decisions without being explicitly programmed to do so. To train the ML model, the ML subsystem may be configured to use a feature set comprising one or more predefined objects with one or more known identifiers for training. Here, the one or more known identifiers are used as the one or more class labels. By training the ML model with the feature set, the ML subsystem may be configured to build a trained ML model that is capable identifying and subsequently classifying the objects.

To identify the objects and their corresponding layouts, the ML subsystem may be configured to overlay, using the trained ML model, an S×S matrix on the standard compiler output, thereby creating a grid-based object identification framework. In response, the ML subsystem may be configured to detect, using the trained ML model, the one or more objects and the one or more layouts in the grid-based object identification framework. In one aspect, the one or more layouts may indicate positional attributes of the one or more objects within the grid-based object identification framework. To identify the one or more objects, the ML subsystem may be configured to generate one or more bounding boxes identifying the one or more objects. In response, the ML subsystem may be configured to classify the one or more bounding boxes into one or more class labels, wherein the one or more class labels identify the one or more objects.

Next, as shown in block 310, the process flow includes retrieving, from a three dimensional (3D) object repository, one or more 3D models for the one or more objects. In some embodiments, the system may be configured to query the 3D object repository using the one or more class labels to identify the one or more 3D models for the one or more objects. In response to the querying, the system may be configured to retrieve the one or more 3D models for the one or more objects.

Next, as shown in block 312, the process flow includes generating, using a 3D interactive platform, an augmented modeling session for display on the first user input device. In some embodiments, the augmented modeling session may include at least the one or more 3D models for the one or more objects based on the one or more layouts for user review. The 3D interactive platform provides the user with the ability to move and perform interaction in 3D space. In some embodiments, the 3D space used for interaction can be the real physical space, a virtual space representation simulated in the computer, or a combination of both. Using the augmented modeling session, the user may review the code change by performing selection and manipulation of objects in virtual space, change the layouts, test functionalities introduced by the code change, and visualize the review process.

Next, as shown in block 314, the process flow includes receiving, from the first user input device, a user acknowledgement of the code change based on at least the user review. In some embodiments, the user may not only provide their acknowledgement of the code change, but also suggest edits to the developer, and/or reject the code change altogether. In cases the where the user proposes edits, the system may be configured to receive, from the first user input device via the 3D interactive platform, one or more edits for the code change based on at least the user review. In response, the system may be configured to generate a revised code change suggestion based on at least receiving the one or more edits for the code change. Then, the system may be configured to transmit control signals configured to cause the second user input device to display the revised code change suggestion. Here, the revised code change suggestion is generated as an expected view based on the user edits and sent to the developer with any additional comments.

Next, as shown in block 316, the process flow includes merging the code change with the project repository in response to receiving the user acknowledgement.

FIG. 4 illustrates a data flow diagram for reviewing software code changes in an augmented reality platform, in accordance with an embodiment of the invention. As shown in FIG. 4, the metadata associated with the code change 402 is received from the second user input device (not shown) and is stored in the code change repository 404. A user, using the first input device, may request a pull request 406 that retrieves the code change metadata 402 from the code change repository 404. Then, using the code compiler 406, the code change metadata 402 is compiled and a standard compiler output 410 is generated. This standard compiler output 410 may be subject to object detection 412 to identify objects in the standard compiler output 410 and assign class labels to each object. These class labels are then used to query the 3D objects repository 416 using object keywork extraction 414. Based on the querying, corresponding 3D objects are retrieved from the 3D objects repository 416. Then, an augmented modeling session is generated using a 3D interactive platform to display the augmented model 418. The augmented model may include a number of 3D objects representing the objects identified from the code change metadata 402 that the user may interact with using the 3D interactive platform to review the code change. Based on the review, the user may then provide their code change decision 420 that may include code change approval or code change edits.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for reviewing software code changes in an augmented reality platform, the system comprising:
    at least one processor;
    at least one non-transitory storage device accessible by the at least one processor, wherein the non-transitory storage device comprises instruction code configured to cause the at least one processor to:
    receive a request to merge a code change with a main project repository;
    in response, retrieve metadata associated with the code change;
    generate a standard compiler output by compiling the metadata associated with the code change;
    identify, using a machine learning (ML) subsystem, one or more objects and one or more layouts associated with the one or more objects from the standard compiler output;
    retrieve, from a three dimensional (3D) object repository, one or more 3D models for the one or more objects;
    generate, using a 3D interactive platform, an augmented modeling session for display on a first user input device, wherein the augmented modeling session comprises at least the one or more 3D models for the one or more objects based on the one or more layouts for user review;
    receive, from the first user input device, a user acknowledgement of the code change; and
    merge the code change with the project repository.

2. The system of claim 1, wherein identifying the one or more objects and the one or more layouts further comprises:
    deploying, using the ML subsystem, a trained ML model on the standard compiler output, wherein the standard compiler output is an image;
    overlaying, using the trained ML model, an S×S matrix on the standard compiler output, thereby creating a grid-based object identification framework; and
    detecting, using the trained ML model, the one or more objects and the one or more layouts in the grid-based object identification framework, wherein the one or more layouts indicate positional attributes of the one or more objects within the grid-based object identification framework.

3. The system of claim 2, wherein detecting further comprises:
generating one or more bounding boxes identifying the one or more objects; and
classifying the one or more bounding boxes into one or more class labels, wherein the one or more class labels identify the one or more objects.

4. The system of claim 3, wherein the instruction code is further configured to cause the at least one processor to:
query the 3D object repository using the one or more class labels to identify the one or more 3D models for the one or more objects; and
retrieve the one or more 3D models for the one or more objects.

5. The system of claim 4, wherein the instruction code is further configured to cause the at least one processor to:
generate a feature set using one or more predefined objects with one or more known identifiers, wherein the one or more known identifiers are used as the one or more class labels; and
train, using the ML subsystem, an ML model using the feature set to generate the trained ML model.

6. The system of claim 1, wherein the instruction code is further configured to cause the at least one processor to:
receive, from a second user input device, the metadata associated with the code change; and
store the metadata associated with the code change in a code change repository.

7. The system of claim 6, wherein the instruction code is further configured to cause the at least one processor to:
receive, from the first user input device via the 3D interactive platform, one or more edits for the code change based on at least the user review;
generate a revised code change suggestion based on at least receiving the one or more edits for the code change; and
transmit control signals configured to cause the second user input device to display the revised code change suggestion.

8. A computer program product for reviewing software code changes in an augmented reality platform, the computer program product comprising a non-transitory computer-readable medium comprising code causing a first apparatus to:
receive a request to merge a code change with a main project repository;
in response, retrieve metadata associated with the code change;
generate a standard compiler output by compiling the metadata associated with the code change;
identify, using a machine learning (ML) subsystem, one or more objects and one or more layouts associated with the one or more objects from the standard compiler output;
retrieve, from a three dimensional (3D) object repository, one or more 3D models for the one or more objects;
generate, using a 3D interactive platform, an augmented modeling session for display on a first user input device, wherein the augmented modeling session comprises at least the one or more 3D models for the one or more objects based on the one or more layouts for user review;
receive, from the first user input device, a user acknowledgement of the code change; and
merge the code change with the project repository.

9. The computer program product of claim 8, wherein identifying the one or more objects and the one or more layouts further comprises:
deploying, using the ML subsystem, a trained ML model on the standard compiler output, wherein the standard compiler output is an image;
overlaying, using the trained ML model, an S×S matrix on the standard compiler output, thereby creating a grid-based object identification framework; and
detecting, using the trained ML model, the one or more objects and the one or more layouts in the grid-based object identification framework, wherein the one or more layouts indicate positional attributes of the one or more objects within the grid-based object identification framework.

10. The computer program product of claim 9, wherein detecting further comprises:
generating one or more bounding boxes identifying the one or more objects; and
classifying the one or more bounding boxes into one or more class labels, wherein the one or more class labels identify the one or more objects.

11. The computer program product of claim 10, wherein the first apparatus is further configured to:
query the 3D object repository using the one or more class labels to identify the one or more 3D models for the one or more objects; and
retrieve the one or more 3D models for the one or more objects.

12. The computer program product of claim 11, wherein the first apparatus is further configured to:
generate a feature set using one or more predefined objects with one or more known identifiers, wherein the one or more known identifiers are used as the one or more class labels; and
train, using the ML subsystem, an ML model using the feature set to generate the trained ML model.

13. The computer program product of claim 8, wherein the first apparatus is further configured to:
receive, from a second user input device, the metadata associated with the code change; and
store the metadata associated with the code change in a code change repository.

14. The computer program product of claim 13, wherein the first apparatus is further configured to:
receive, from the first user input device via the 3D interactive platform, one or more edits for the code change based on at least the user review;
generate a revised code change suggestion based on at least receiving the one or more edits for the code change; and
transmit control signals configured to cause the second user input device to display the revised code change suggestion.

15. A method for reviewing software code changes in an augmented reality platform, the method comprising:
receiving a request to merge a code change with a main project repository;
in response, retrieving metadata associated with the code change;
generating a standard compiler output by compiling the metadata associated with the code change;
identifying, using a machine learning (ML) subsystem, one or more objects and one or more layouts associated with the one or more objects from the standard compiler output;

retrieving, from a three dimensional (3D) object repository, one or more 3D models for the one or more objects;

generating, using a 3D interactive platform, an augmented modeling session for display on a first user input device, wherein the augmented modeling session comprises at least the one or more 3D models for the one or more objects based on the one or more layouts for user review;

receiving, from the first user input device, a user acknowledgement of the code change; and merging the code change with the project repository.

16. The method of claim 15, wherein identifying the one or more objects and the one or more layouts further comprises:

deploying, using the ML subsystem, a trained ML model on the standard compiler output, wherein the standard compiler output is an image;

overlaying, using the trained ML model, an S×S matrix on the standard compiler output, thereby creating a grid-based object identification framework; and detecting, using the trained ML model, the one or more objects and the one or more layouts in the grid-based object identification framework, wherein the one or more layouts indicate positional attributes of the one or more objects within the grid-based object identification framework.

17. The method of claim 16, wherein detecting further comprises:

generating one or more bounding boxes identifying the one or more objects; and classifying the one or more bounding boxes into one or more class labels, wherein the one or more class labels identify the one or more objects.

18. The method of claim 17, wherein the method further comprises:

querying the 3D object repository using the one or more class labels to identify the one or more 3D models for the one or more objects; and retrieving the one or more 3D models for the one or more objects.

19. The method of claim 18, wherein the method further comprises:

generating a feature set using one or more predefined objects with one or more known identifiers, wherein the one or more known identifiers are used as the one or more class labels; and training, using the ML subsystem, an ML model using the feature set to generate the trained ML model.

20. The method of claim 15, wherein the method further comprises:

receiving, from a second user input device, the metadata associated with the code change; and storing the metadata associated with the code change in a code change repository.

* * * * *